United States Patent Office 3,592,800
Patented July 13, 1971

3,592,800
POLYMERIZATION OF VINYL CHLORIDE IN AQUEOUS SUSPENSION IN THE PRESENCE OF LOW VISCOSITY POLYVINYL ALCOHOL AND A PROTECTIVE COLLOID
Werner Oschmann, 148 Mundenheimer Strasse, 6700 Ludwigshafen, Germany; Richard Greger, 63 Kirchwaldstrasse, 6800 Mannheim, Germany; and Alfred Hauss, 7 Kranichstrasse; and Gernot Winter, 2 Gneisenaustrasse, both of 6700 Ludwigshafen, Germany
No Drawing. Filed Nov. 26, 1968, Ser. No. 779,217
Claims priority, application Germany, Nov. 29, 1967, P 17 20 328.0
Int. Cl. C08f *1/11, 3/30, 15/28*
U.S. Cl. 260—85.5                    5 Claims

ABSTRACT OF THE DISCLOSURE

Process for polymerizing vinyl chloride in aqueous suspension in the presence of conventional high molecular weight protective colloids and a low molecular weight polyvinyl alcohol which improves the absorption of plasticizer without affecting the high electrical resistance.

---

This invention relates to a process for the production of vinyl chloride polymers in which vinyl chloride is polymerized in aqueous suspension in the presence of mixtures of protective colloids.

In the polymerization of vinyl chloride in aqueous suspension, the vinyl chloride is usually dispersed in water with mechanical stirring by means of one or more protective colloids and polymerized with oil-soluble catalysts. Relatively compact granules are obtained which are quite suitable for the manufacture of rigid materials but cannot be satisfactorily plasticized because they have too high bulk densities, too little porosity and inadequate absorptivity for plasticizers. As a result of this, the particles are inadequately provided with plasticizer and gel only slowly and nonuniformly, and finished products prepared therefrom have a large number of defects known as "fish-eyes."

It has therefore been recommended that mixtures of protective colloids and surfactants should be used in the production of suspension polyvinyl chloride. Products having good porosity, bulk density and plasticizer absorptivity can in fact be prepared with such combinations. The effect of the surfactants is better, the stronger their surface-active character is. Polymers prepared in this way are however not suitable (or have only limited suitability) for high-quality insulating materials, for example cable sheathing, because surfactants cause a marked lowering of the electrical resistance.

In a process for the production of polyvinyl chloride powders having satisfactory obsorptivity for plasticizers and at the same time adequate insulating action, very fine granules are prepared by means of highly effective protective colloids but they have the disadvantage of having poor flow properties. The plasticizer is absorbed well because of their large specific surface area. This measure has pratically no effect on the occurrence of "fish-eyes" in the finished products made therefrom. In the same way polyvinyl chloride powders having a high absorptivity for plasticizers and satisfactory insulating action are obtained by grinding products of large particle size, but grinding is an additional operation requiring extra time. In particular however the fine products prepared by these methods have poor flowability or none at all and this causes difficulties in charging into storage, pneumatic conveyance and feeding into processing equipment.

An object of this invention is to prepare a polyvinyl chloride having very fine and porous particles which have a good absorptivity for plasticizers and do not result in "fish-eyes" in the finished products. Another object of the invention is to prepare polyvinyl chloride good flowability. A further object is to make polyvinyl chloride that can be processed into products having high electrical resistance so that they are suitable as insulating materials.

These objects are achieved by polymerizing vinyl chloride in aqueous suspension by means of an oil-soluble free-radical forming substance in the presence of from 0.01 to 0.5% by weight (with reference to the amount of monomer) of a polyvinyl alcohol or cellulose ether as protective colloid having a viscosity of more than 20 centipoises, and by adding together with the protective colloid 0.01 to 1.0% by weight (with reference to the amount of monomer) of a polyvinyl alcohol which contains from 2 to 25% by weight of acetyl groups and has a viscosity of from 1 to 8 centipoises.

Protective colloids according to this invention are commercially available cellulose ethers and mixed ethers such as methylcellulose, methylhydroxypropylcellulose, methylhydroxyethylcellulose and carboxymethylcellulose, or commercially available polyvinyl alcohols which may contain acetyl groups from their manufacture. The viscosity of these protective colloids, measured in a 4% aqueous solution at 20° C., should be more than 20 centipoises, preferably more than 30 centipoises. Protective colloids having viscosities of more than 50,000 centipoises are generally not suitable for the process. Mixtures of these protective colloids are also suitable for the process. The amount of protective colloids is advantageously from 0.01 to 0.5% by weight (with reference to the amount of monomer) and particularly from 0.01 to 0.2% by weight.

The polyvinyl alcohol containing acetyl groups should have an extremely low molecular weight and should have a viscosity of from 1 to 8, but preferably less than 6, centipoises measured in 4% aqueous solution at 20° C. The content of residual acetate groups should be from 25 to 2% by weight, equivalent to a molar hydrolysis degree of from about 66 to 98%. It is used in an amount of from 0.01 to 1.0% by weight, but preferably from 0.05 to 0.5% by weight with reference to the amount of monomer. Mixtures of such substances may also be used. When used alone, these extremely low molecular weight polyvinyl alcohols have practically no, or only inadequate, protective colloid action in the amounts conventionally used and (in the absence of conventional highly effective protective colloids) their use in the polymerization therefore causes the formation of coarse material or coagulate. If a change is made to polyvinyl alcohols of higher viscosity, the protective colloid action of the substances becomes slowly greater and the suspension polymerisation may be carried out without disturbance, but these polyvinyl alcohols having higher molecular weight no longer result in the said favorable properties in the polymers.

Conventional organic peroxides may be used as catalysts in carrying out the suspension polymerization, for example dilauroyl peroxide, dinanoyl peroxide, acetylcyclohexylsulfonyl peroxide and tert-butyl perpivalate, and also diazo compounds such as azoisobutyronitrile, and mixtures of two or more such catalysts in an amount in all of 0.01 to 0.5% by weight with reference to the amount of monomer.

Other possible but not essential additives in carrying out the polymerization are buffer substances such as ammonia or ammonium or alkali metal salts of organic acids, phosphates and the like, the amount of these being such that the pH value of the aqueous phase is from 4 to 10, preferably from 6 to 8. The additional use of a small amount of surfactant does not disturb the course of the polymerization, but as already stated is not only not necessary in this process but rather is unfavorable and only applies for the production of special effects. Particularly nonionic substances such as partial esters of polyhydric alcohols and their oxyethylation products, and also oxyethylated long-chain aliphatic alcohols, phenols or fatty acids are suitable as surfactants. The use of ionic surfactants, with or without the addition of alkaline earth metal salts, is possible in principle but usually results in inadequate electrical resistance.

The most favorable weight ratio of monomer phase to aqueous phase in this process is from 10:90 to 40:60.

For certain applications it is possible in this process to replace some of the vinyl chloride by other polymerizable unsaturated compounds such as vinylidene chloride, vinyl acetate and acrylonitrile and thus to obtain copolymers. The amount of comonomer(s) should not exceed 25%.

Products obtainable according to the said process by combining conventional protective colloids with extremely low molecular weight polyvinyl alcohols containing acetyl groups have the advantage of high porosity and outstanding absorptivity for plasticizers. Moldings prepared from the polymers obtained according to this invention have high electrical resistance and improved thermal stability. The polymers moreover have uniform particle size and good flowability; moreover they result in finished products practically free from "fish-eyes."

The production of suspension polyvinyl chloride having this combination of properties which is particularly favorable for processing was not possible by prior art methods.

The most favorable particle size for processing has a distribution maximum of from 100 to 200 microns. The particle size distribution may be prepared in the desired range without difficulty by varying the concentration of protective colloid and low molecular weight polyvinyl alcohol and the rate of stirring in the autoclave.

The invention is illustrated by the following examples. They illustrate the effectiveness of the claimed combination as compared with prior art methods. The parts mentioned are parts by weight.

EXAMPLE 1

22,800 parts of water, 365 parts of a 2% aqueous solution of a methylhydroxypropylcellulose having a methoxy content of about 30% and a propylene oxide content of about 4.5% and a viscosity of 430 centipoises measured on a 4% aqueous solution, 244 parts of a 10% aqueous solution of an extremely low molecular weight polyvinyl alcohol having 20% of acetyl groups and a viscosity of about 2.2 centipoises measured on a 4% solution, 22 parts of dilauroyl peroxide and 4 parts of ammonium carbonate are placed in a glass-lined autoclave fitted with a stirrer and temperature control means. The autoclave is closed and air therein is expelled with nitrogen. 12,200 parts of vinyl chloride is then forced into the autoclave with nitrogen. The nitrogen present in the autoclave is removed by degassing and polymerization is carried out with rapid stirring at 56° C. Eleven hours later the polymerization is stopped at a conversion of about 85%. The residual monomer is removed and the product separated from water by centrifuging, washed and dried. A suspension polymer is obtained having a K value of 70 and whose characteristics are collated in the following table.

The following abbreviations are used in the table:

E=Example No.
PA=plasticizer absorption (g. of dioctyl phthalate per 100 g. of polyvinyl chloride)
PD=particle size distribution—percent retained on the following mesh widths:
  a=300 microns
  b=250 microns
  c=200 microns
  d=150 microns
  e=100 microns
BD=bluk density in g./liter
F=flowability in g./second measured in a Ford cup having a 6 mm. nozzle
SR=specific resistance in ohms/cm. according to ASTM D 257
S=stability in minutes measured on plasticized roller sheet prepared from 70 parts of polyvinyl chloride powder and 30 parts of dioctyl phthalate with 1.0 part of lead stabilizer at 180° C.
FE=fish-eyes. Comparison with standard samples, 5 being a very large number and 1 an extremely small number of "fish-eyes" in a rolled sheet; 2, 3 and 4 are appropriate intermediate gradations.

TABLE 1

| E | 1 | 2 | 3 | 4 | 5 | 6 |
|---|---|---|---|---|---|---|
| PA | 48 | 36 | 56 | 40 | 54 | 32 |
| PDa | 1.0 | 7.6 | 0.6 | 10.0 | 8.8 | 0 |
| PDb | 13.8 | 19.6 | 8.4 | 22.6 | 39.6 | 3.2 |
| PDc | 46.8 | 40.2 | 37.2 | 47.6 | 81.6 | 25.6 |
| PDd | 87.0 | 72.6 | 84.0 | 85.2 | 83.2 | 67.2 |
| PDe | 94.8 | 90.6 | 95.2 | 96.2 | 86.0 | 93.0 |
| BD | 469.0 | 529 | 461 | 513 | 474 | 537 |
| F | 1.78 | 2.07 | 1.92 | 1.84 | 1.76 | 1.96 |
| SR | $8.3 \times 10^{13}$ | $1.3 \times 10^{14}$ | $8.7 \times 10^{13}$ | $1.2 \times 10^{14}$ | $3.7 \times 10^{12}$ | $1.4 \times 10^{14}$ |
| S | 140 | 80 | 125 | 95 | 110 | 110 |
| FE | 2 | 5 | 2 | 5 | 4 | 5 |

EXAMPLE 2

This is a comparative example:

A comparative experiment carried out with the same amounts of the substances and under entirely analogous conditions but in which the extremely low molecular weight polyvinyl alcohol is omitted, results in products having the properties set out in column 2 in Table 1.

Comparison of the results of Examples 1 and 2 shows the superiority of the product prepared according to Example 1. The considerable extent to which the particles are broken up by the extremely low molecular weight polyvinyl alcohol, the absorptivity for plasticizer resulting therefrom and the lower bulk density should be noted. Stability is also considerably improved, whereas the electrical resistance is changed only insignificantly and within the limits of error of the method.

EXAMPLE 3

A procedure analogous to that in Example 1 is followed but 365 parts of a 2% aqueous solution of polyvinyl alcohol having an acetyl group content of 17% and a viscosity of 35 centipoises (measured on a 4% aqueous solution) is used instead of methylhyroxypropylcellulose and an extremely low molecular weight polyvinyl alcohol having a viscosity of 1.2 centipoises is used in the same amount instead of the extremely low molecular weight polyvinyl alcohol having a viscosity of 2.2 centipoises. Properties of the product are given in column 3 of the Table 1.

EXAMPLE 4

This is a comparative example:

The procedure is as in Example 3 but the extremely low molecular weight polyvinyl alcohol is omitted. The test results of the product obtained are set out in column 4 in Table 1.

Comparison between Examples 3 and 4 shows the superiority of the product prepared according to Example 3.

In this case also the marked breaking up of the particles and the high absorptivity for plasticizer occasioned thereby, caused by the extremely low molecular weight polyvinyl alcohol is noticeable. Stability is also substantially improved whereas the electrical resistance is only changed insignificantly and within the limits of experimental error.

EXAMPLE 5

This is a comparative example:

98,000 parts of water, 1260 parts of a 2% aqueous solution of a polyvinyl alcohol having an acetyl group content of 17% and a viscosity of 35 centipoises (measured on a 4% aqueous solution), 84 parts of sorbitol tristearate which has been reacted with ethylene oxide, 59 parts of dilauroyl peroxide, 6 parts of acetylcyclohexanesulfonyl peroxide and 13 parts of ammonium carbonate are placed in a glass-lined autoclave fitted with stirring means and temperature control means and, as described in Example 1, 42,000 parts of vinyl chloride is added and polymerization and recovery of the product are carried out analogously to Example 1. The properties of the polymer obtained are given in column 5 of Table 1.

Comparison of Examples 3 and 5 shows the superiority of the product prepared according to Example 3. Although by using a nonionic surfactant in Example 5 a high absorptivity for plasticizer is obtained, the product of Example 3 has a substantially better stability and an incomparably higher specific resistance. Far fewer fish-eyes are found in the test.

EXAMPLE 6

This is a comparative example:

98,000 parts of water, 630 parts of a 2% aqueous solution of a polyvinyl alcohol having a residual acetyl group content of 17% and a viscosity of 35 centipoises (measured on a 4% aqueous solution), 630 parts of a 2% aqueous solution of a methylhydroxypropyl cellulose having a methoxy content of about 30% and a propylene oxide content of about 4.5% and a viscosity of 430 centipoises (measured on a 4% solution), 84 parts of dilauroyl peroxide and 65 parts of ammonium carbonate are placed in a glass-lined autoclave which is fitted with stirring means and temperature control means. Then as described in Example 1, 42,000 parts of vinyl chloride is added and the polymerization and recovery of the polymer are carried out analogously to Example 1. The properties of the polymer obtained may be seen from column 6 of Table 1.

Comparison of Examples 1 and 6 shows that the combination of two highly effective protective colloids used in Example 6 results in a product having a high bulk density and very low absorption of plasticizer and moreover exhibits a large number of fish-eyes after molding. The superiority of the polymer prepared according to Example 1 is again clearly evident.

EXAMPLES 7 TO 19

Further tests according to this invention are carried out by the methods described in Example 1 but different protective colloids are used in varying amounts.

The protective colloids are characterized in Table 2. A is used to indicate protective colloids having a viscosity of more than 20 centipoises and B to indicate protective colloids having a viscosity of less than 8 centipoises.

The viscosity in each case is measured in 4% aqueous solution at 20° C.

The following abbreviations are used in Table 2:
No.=number
V=viscosity
RA=percentage of residual acetate groups
MG=percentage of methoxyl groups
POG=percentage of propylene oxide groups
MHPC=methylhydroxypropylcellulose
PVA=polyvinyl alcohol.

TABLE 2

| | Type | V | RA | MG | POG |
|---|---|---|---|---|---|
| No.: | | | | | |
| A1 | MHPC | 430 | | 30 | 4.5 |
| A2 | MHPC | 16,000 | | 23 | 9.0 |
| A3 | PVA | 50 | 11 | | |
| A4 | PVA | 35 | 17 | | |
| B1 | PVA | 1.2 | 20 | | |
| B2 | PVA | 2.2 | 20 | | |
| B3 | PVA | 4 | 2 | | |
| B4 | PVA | 4 | 15 | | |
| B5 | PVA | 5 | 22 | | |
| B6 | PVA | 7 | 19 | | |

The particle properties of the products of the various tests are tabulated in Table 3.

Numbering of the protective colloids A and B is according to Table 2. Concentrations are percentages by weight of the pure protective colloid with reference to the monomer. Absorption of plasticizer is given in grams of dioctyl phthalate per 100 g. of polyvinyl chloride. The specific resistance is measured according to ASTM D 257 in $10^{13}$ [ohms×cm.]. The fish-eye test is carried out according to the method specified in Table 1 above. Stability in minutes is measured at 180° C. on a rolled sheet which has been prepared from 70 parts of polyvinyl chloride powder and 30 g. of dioctyl phthalate with 1 part of lead stabilizer. Bulk density is measured in g./liter. Flowability is measured in grams per second in a Ford cup having a 6 mm. nozzle.

The following abbreviations are used in Table 3:

E=Example
Auxiliaries=auxiliaries used in the polymerization
PCA=protective colloid A; PCB=protective colloid B
Conc.=concentration
PA=plasticizer absorption
SR=specific resistance
Properties=properties of the particles
FE=fish-eyes
Sta=stability
BD=bulk density
F=flowability

TABLE 3

| | Auxiliaries | | | | Properties | | | | |
|---|---|---|---|---|---|---|---|---|---|
| E | PCA | Conc. | PCB | Conc. | PA | SR | FE | Sta | BD | F |
| 7 | A1 | 0.06 | B2 | 0.20 | 48 | 8.3 | 2 | 140 | 469 | 1.78 |
| 8 | A4 | 0.06 | B1 | 0.20 | 56 | 8.7 | 2 | 125 | 461 | 1.92 |
| 9 | A1 | 0.06 | B6 | 0.20 | 54 | 11.0 | 3 | 145 | 405 | 1.6 |
| 10 | A1 | 0.06 | B5 | 0.01 | 46 | 9.8 | 4 | 125 | 495 | 1.8 |
| 11 | A2 | 0.01 | B5 | 0.70 | 60 | 11.0 | 2 | 155 | 403 | 1.6 |
| 12 | A1 | 0.10 | B4 | 0.05 | 46 | 9.0 | 3 | 140 | 474 | 1.7 |
| 13 | A3 | 0.03 | B5 | 0.20 | 56 | 9.8 | 3 | 140 | 440 | 1.7 |
| 14 | A3 | 0.30 | B5 | 0.20 | 72 | 9.4 | 2 | 140 | 390 | 1.5 |
| 15 | A1 | 0.01 | B5 | 0.20 | 56 | 1.1 | 3 | 130 | 437 | 1.7 |
| 16 | A1 | 0.30 | B5 | 0.20 | 68 | 9.7 | 2 | 155 | 395 | 1.5 |
| 17 | A2 | 0.40 | B3 | 0.03 | 56 | 8.2 | 3 | 130 | 410 | 1.6 |
| 18 | A4 | 0.05 | B3 | 0.03 | 54 | 1.2 | 4 | 110 | 490 | 1.7 |
| 19 | A4 | 0.04 | B3 | 0.40 | 52 | 8.7 | 4 | 150 | 485 | 1.6 |

We claim:

1. A process for the polymerization of vinyl chloride in aqueous suspension by means of an oil-soluble substance which forms free radicals in the presence of 0.01 to 0.5% with reference to the amount of monomer of a polyvinyl alcohol or cellulose ether as protective colloid having a viscosity of more than 20 centipoises, wherein 0.01 to 1.0% by weight with reference to the amount of monomer of a polyvinyl alcohol which contains 2 to 25% by weight of acetyl groups and has a viscosity of from 1 to 8 centipoises is added in combination with the protective colloid.

2. A process as claimed in claim 1 wherein 0.05 to 0.5% by weight with reference to the amount of monomer of a polyvinyl alcohol is added.

3. A process as claimed in claim 1 wherein a polyvinyl alcohol having an acetyl group content of about 20% is used.

4. A process as claimed in claim 1 wherein a polyvinyl alcohol having a viscosity of from 1 to 3 centipoises is used.

5. A process as claimed in claim 1 wherein polymerization is carried out in the presence of up to 25% of comonomer(s) with reference to the total amount of monomers.

References Cited

UNITED STATES PATENTS 3,205,204   9/1965   Hechmaier et al. ___ 260—92.8W

JOSEPH L. SCHOFER, Primary Examiner

J. A. DONAHUE, Jr., Assistant Examiner

U.S. Cl. X.R.

260—87.1, 87.5, 87.7, 92.8

PO-1050
(5/69)

UNITED STATES PATENT OFFICE
CERTIFICATE OF CORRECTION

Patent No. 3,592,800        Dated July 13, 1971

Inventor(s) Werner Oschmann et al

It is certified that error appears in the above-identified patent and that said Letters Patent are hereby corrected as shown below:

Column 1, line 10, in the heading, insert -- ,assignors to Badische Anilin- & Soda-Fabrik Aktiengesellschaft, Ludwigshafen. (Rhine), Germany --.

Column 1, line 54, "obsorptivity" should read -- absorptivity --.

Column 4, line 46, "methylhyroxypropylcellulose" should read -- methylhydroxypropylcellulose --.

Signed and sealed this 21st day of March 1972.

(SEAL)
Attest:

EDWARD M. FLETCHER, JR.
Attesting Officer

ROBERT GOTTSCHALK
Commissioner of Patents